United States Patent
Lee et al.

(10) Patent No.: US 10,547,030 B2
(45) Date of Patent: Jan. 28, 2020

(54) SECONDARY BATTERY

(71) Applicant: Samsung SDI Co., Ltd., Yongin-si, Gyeonggi-do (KR)

(72) Inventors: Hyun soo Lee, Yongin-si (KR); Yunki Baik, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 197 days.

(21) Appl. No.: 15/719,373

(22) Filed: Sep. 28, 2017

(65) Prior Publication Data

US 2018/0114954 A1    Apr. 26, 2018

(30) Foreign Application Priority Data

Oct. 24, 2016    (KR) .................. 10-2016-0138252

(51) Int. Cl.
  *H01M 2/12*    (2006.01)
  *H01M 2/30*    (2006.01)
  *H01M 2/02*    (2006.01)
  *H01M 10/05*    (2010.01)

(52) U.S. Cl.
  CPC ........... *H01M 2/0202* (2013.01); *H01M 2/12* (2013.01); *H01M 2/30* (2013.01); *H01M 10/05* (2013.01); *H01M 2200/20* (2013.01)

(58) Field of Classification Search
  CPC ...... H01M 2/1241; H01M 2/345; H01M 2/12; H01M 2/1235; H01M 2200/20
  See application file for complete search history.

(56) References Cited

U.S. PATENT DOCUMENTS 6,403,250 B1   6/2002  Azema et al.
2010/0323234 A1*  12/2010  Kim .................. H01M 2/206
                                          429/158
2011/0183167 A1   7/2011  Moon et al.
(Continued)

FOREIGN PATENT DOCUMENTS

JP    2000-90960 A    3/2000
KR    10-2010-0137904 A    12/2010
(Continued)

OTHER PUBLICATIONS

EPO Extended Search Report dated Mar. 8, 2018, for corresponding European Patent Application No. 17195098.3 (8 pages).

*Primary Examiner* — Maria Laios
(74) *Attorney, Agent, or Firm* — Lewis Roca Rothgerber Christie LLP (57) ABSTRACT

A secondary battery includes: a case having an internal space; an electrode assembly inserted in the case and including a first electrode plate, a second electrode plate, and a separator between the first electrode plate and the second electrode plate; a cap plate sealing the case, electrically connected to the first electrode plate of the electrode assembly, and including a safety vent on a region of the cap plate; an upper insulation member on the cap plate; a sub terminal plate on the upper insulation member and electrically connected to the safety vent through a connector part extending at an end of the sub terminal plate; and a terminal plate making contact with and coupled to a top portion of the upper insulation member and coupled to the sub terminal plate.

11 Claims, 5 Drawing Sheets

(56) References Cited

U.S. PATENT DOCUMENTS

| | | | | |
|---|---|---|---|---|
| 2014/0272492 | A1* | 9/2014 | Lange | H01M 2/345 |
| | | | | 429/61 |
| 2015/0295221 | A1 | 10/2015 | Urano et al. | |
| 2016/0036033 | A1* | 2/2016 | Zhang | H01M 2/345 |
| | | | | 429/53 |

FOREIGN PATENT DOCUMENTS

| | | |
|---|---|---|
| KR | 10-2015-0114634 A | 10/2015 |
| KR | 10-2015-0139129 A | 12/2015 |
| KR | 10-2016-0020061 A | 2/2016 |

\* cited by examiner

SECONDARY BATTERY

CROSS-REFERENCE TO RELATED APPLICATION

This application claims priority to and the benefit of Korean Patent Application No. 10-2016-0138252, filed on Oct. 24, 2016 in the Korean Intellectual Property Office, the entire content of which is herein incorporated by reference.

BACKGROUND

1. Field

Aspects of embodiments of the present invention relate to a secondary battery.

2. Description of the Related Art

Secondary batteries are rechargeable batteries that may be repeatedly charged and discharged, unlike primary batteries. A small-capacity secondary battery may be used in a small-sized portable electronic device, such as a cellular phone, a notebook computer, or a camcorder, and a large-capacity secondary battery may be used as a power source, such as for driving a motor of a hybrid vehicle or an electric vehicle.

A secondary battery includes, for example, an electrode assembly capable of charging and discharging operations, a case accommodating the electrode assembly, a cap plate coupled to an opening of the case, and electrode terminals drawing out the electrode assembly to the outside of the cap plate.

In recent years, an increasing emphasis has been placed on the stability of a secondary battery. Accordingly, when there is a risk of explosion due to internal gases generated in the secondary battery, development of components, such as a safety vent, which allow a cap plate to be first opened before the internal pressure of the secondary battery reaches a certain pressure (e.g., a predetermined pressure), are being conducted.

SUMMARY

According to an aspect of embodiments of the present invention, a secondary battery may have a reduced number of components and a reduced number of process steps, while achieving increased stability of the secondary battery.

The above and other aspects of the present invention will be described in or will be apparent from the following description of some exemplary embodiments.

According to one or more embodiments of the present invention, a secondary battery includes: a case having an internal space; an electrode assembly inserted in the case and including a first electrode plate, a second electrode plate, and a separator between the first electrode plate and the second electrode plate; a cap plate sealing the case, electrically connected to the first electrode plate of the electrode assembly, and including a safety vent on a region of the cap plate; an upper insulation member on the cap plate; a sub terminal plate on the upper insulation member and electrically connected to the safety vent through a connector part extending at an end of the sub terminal plate; and a terminal plate making contact with and coupled to a top portion of the upper insulation member and coupled to the sub terminal plate.

The secondary battery may further include an adhesion member on at least one of contact interfaces where the upper insulation member is coupled to the cap plate and the terminal plate.

The terminal plate may be electrically independent of the cap plate through the upper insulation member.

In addition, the cap plate may include an uneven pattern on a region corresponding to the upper insulation member, and the upper insulation member may be engaged with and coupled to the cap plate through at least one of a protrusion or a groove corresponding to the uneven pattern.

The secondary battery may further include an adhesion member on a contact interface between the upper insulation member and the cap plate.

The terminal plate may include at least one of a protrusion or a groove on a region corresponding to the at least one of the protrusion or the groove of the upper insulation member and may be engaged with and coupled to the at least one of the protrusion or the groove of the upper insulation member.

The secondary battery may further include an adhesion member on a contact interface between the terminal plate and the upper insulation member.

The terminal plate may accommodate and be coupled to the sub terminal plate through a groove having a height corresponding to a thickness of the sub terminal plate.

The secondary battery may further include a current collector plate coupled to the first electrode plate of the electrode assembly on at least one region and coupled to a bottom surface of the cap plate to connect the first electrode plate with the cap plate.

The current collector plate may be welded to the bottom surface of the cap plate.

The sub terminal plate may be welded to the terminal plate and the safety vent.

As described above, in the secondary battery according to one or more embodiments of the present invention, a cap plate, a first insulation plate, and a first terminal plate are coupled together using an adhesion member to be maintained in a stably coupled state, even without a separate coupling member, thereby simplifying configurations of electrode terminals. In addition, a welding process can be reduced, thereby reducing a manufacturing process and cost.

DESCRIPTION OF SOME REFERENCE NUMERALS

| | |
|---|---|
| 100: Secondary battery | 110: Case |
| 120: Electrode assembly | 130: First insulation plate |
| 140: Current collector plate | 150: Fastening plate |
| 160: Lower insulation member | 170: Second insulation plate |
| 180: Cap plate | 183: Uneven pattern |
| 190: Upper insulation member | 191: First upper insulation member |
| 192: Second upper insulation member | 191a: Barrier |
| 191b: Protrusion | 200: Terminal plate |
| 201: First terminal plate | 202: Second terminal plate |
| 201a: Groove | 201b: Groove or protrusion |
| 210: Adhesion member | 220: Sub terminal plate |

DETAILED DESCRIPTION

Herein, some exemplary embodiments of the present invention will be described in further detail with reference to the accompanying drawings such that they can easily be made and used by those skilled in the art.

Figure 1:
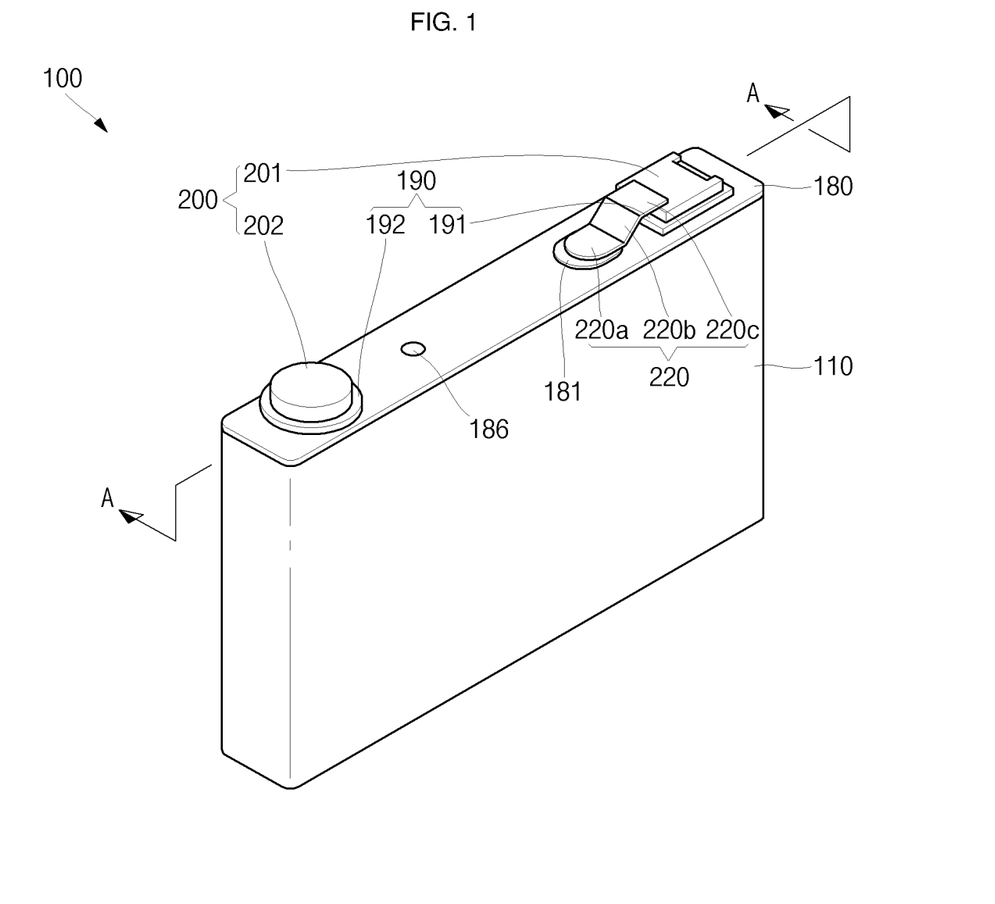
FIG. 1 is a perspective view of a secondary battery according to an embodiment of the present invention.
Figure 2:
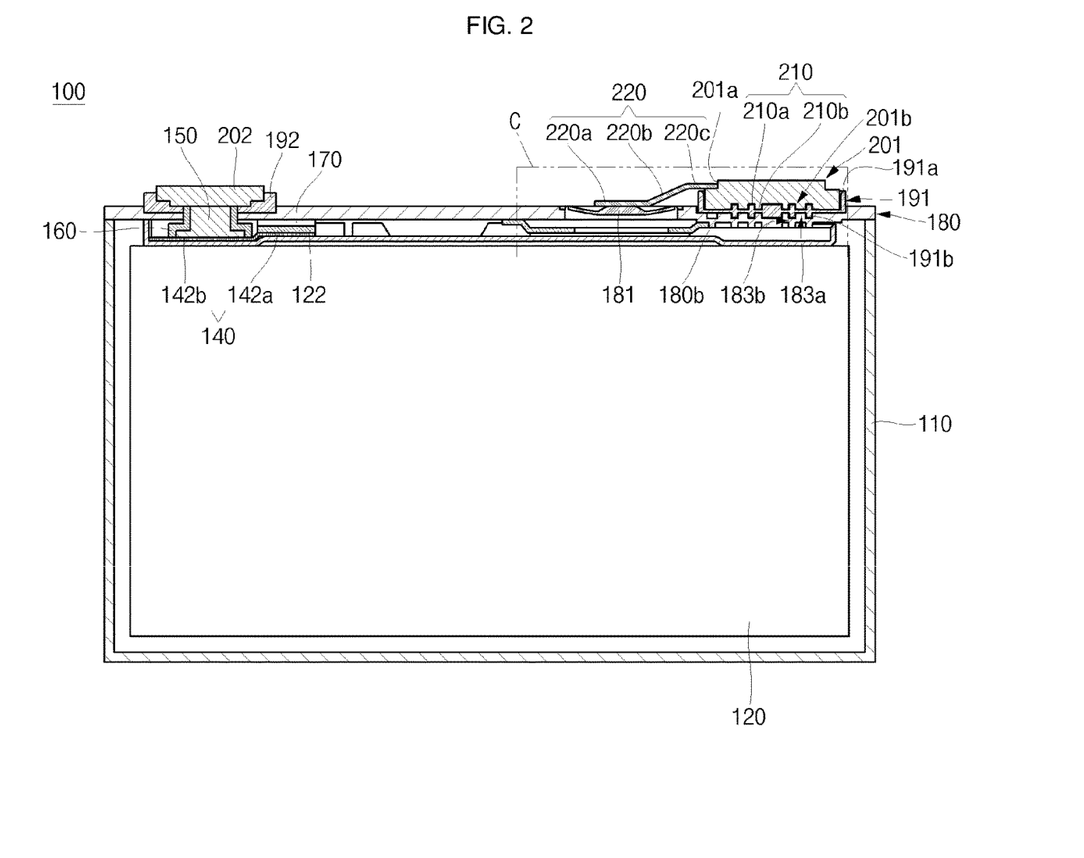
FIG. 2 is a cross-sectional view of the secondary battery of FIG. 1, taken along the line A-A.
Figure 3:
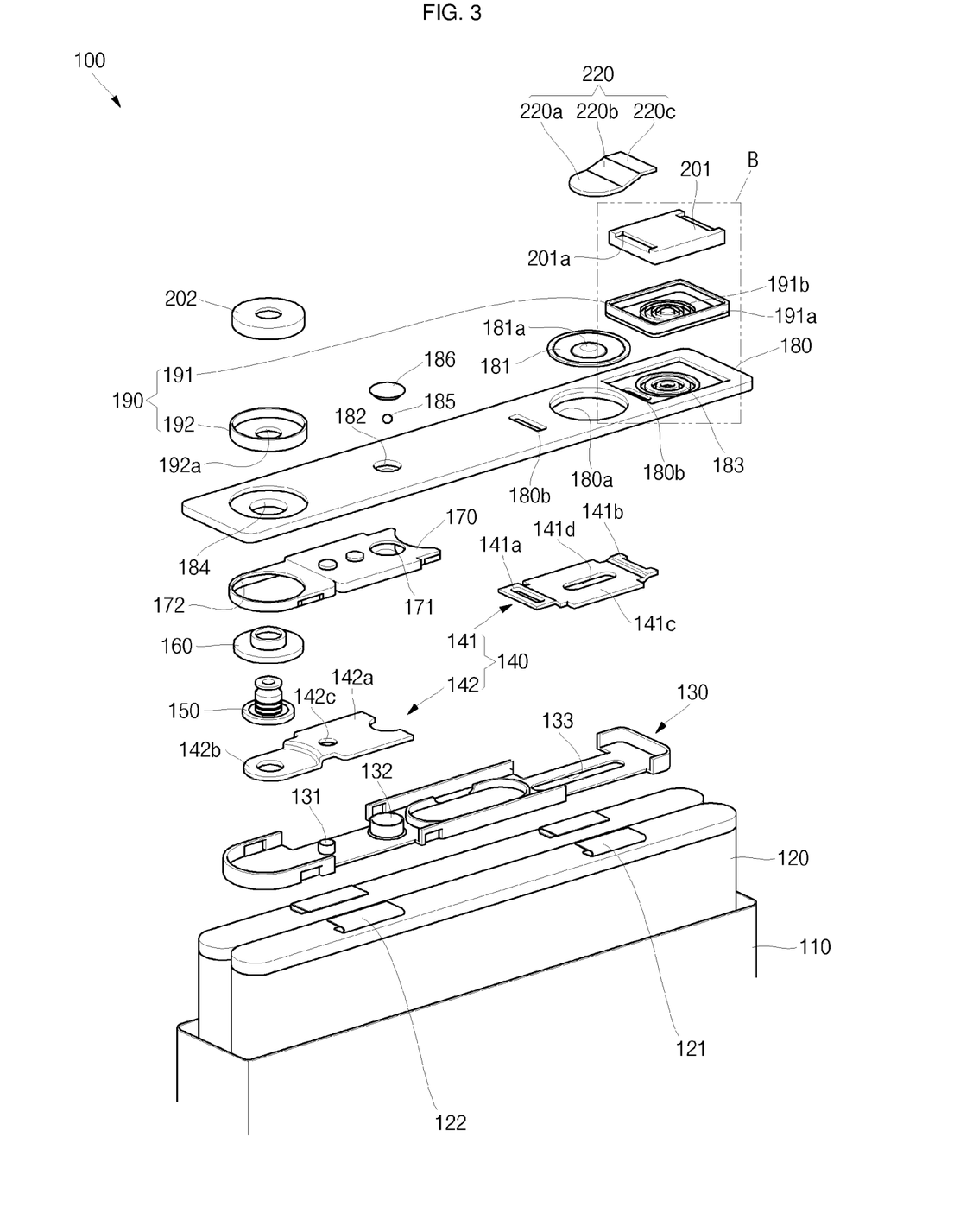
FIG. 3 is an exploded perspective view of the secondary battery of FIG. 1.
Figure 4:
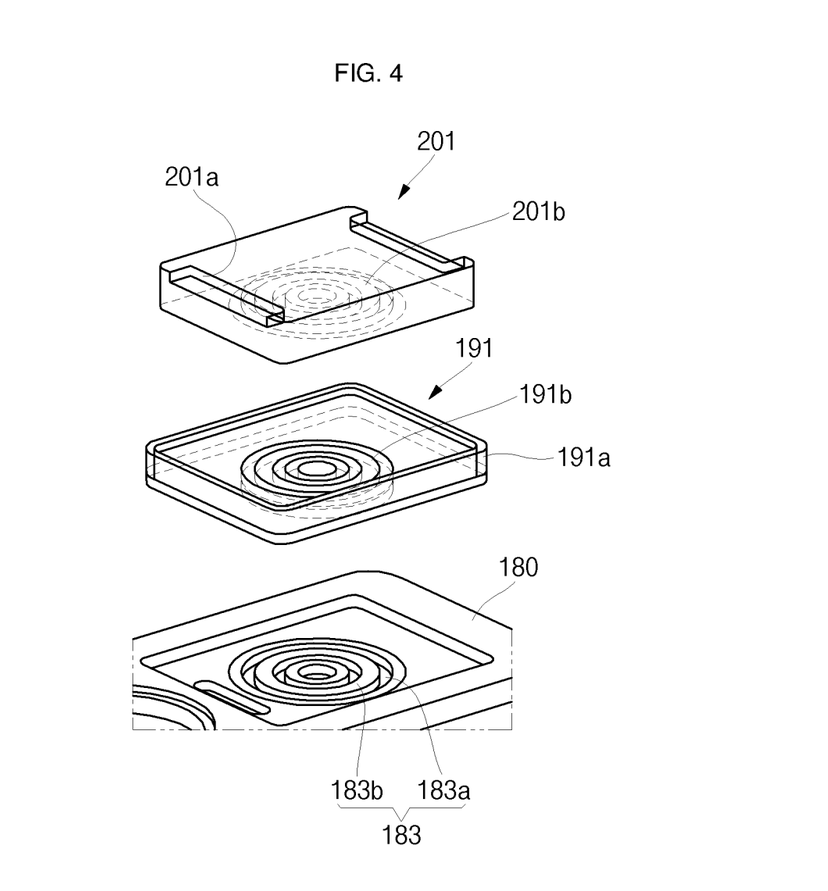
FIG. 4 is a partial exploded view of a region "B" of FIG. 3.
Figure 5:
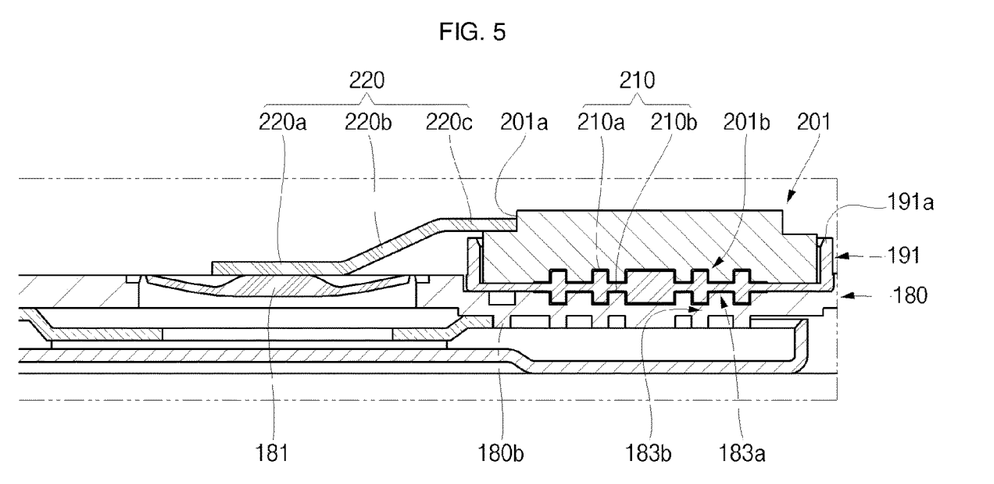
FIG. 5 is a partially exploded view of a region "C" of FIG. 2.

FIG. 1 is a perspective view of a secondary battery according to an embodiment of the present invention; FIG. 2 is a cross-sectional view of the secondary battery of FIG. 1, taken along the line A-A; FIG. 3 is an exploded perspective view of the secondary battery of FIG. 1; FIG. 4 is a partial exploded view of a region "B" of FIG. 3; and FIG. 5 is a partially exploded view of a region "C" of FIG. 2.

Referring to FIGS. 1 to 4, a secondary battery 100 according to an embodiment of the present invention may include a case 110, an electrode assembly 120, a first insulation plate 130, a current collector plate 140, a fastening plate 150, a lower insulation member 160, a second insulation plate 170, a cap plate 180, an upper insulation member 190, a terminal plate 200, and a sub terminal plate 220.

The case 110 may be made of a conductive metal, such as aluminum, an aluminum alloy, or a nickel-plated steel, and may have a generally hexahedron shape having an opening through which the electrode assembly 120 may be inserted and placed in the case 110. The opening may be a substantially opened part of the peripheral edge of the case 110 contacting the cap plate 130.

In an embodiment, the interior surface of the case 110 is subjected to insulation treatment to prevent or substantially prevent an electrical short circuit from occurring inside the case 110. In addition, according to an embodiment of the present invention, an electrode of the electrode assembly 120 may be electrically connected to the case 110 through the cap plate 180. In this case, the insulation treatment of the interior surface of the case 110 may also make it possible to prevent or substantially prevent an internal electrical short circuit.

The electrode assembly 120 may be formed by winding or laminating a stacked structure including a first electrode plate, a separator, and a second electrode plate, which are thin plates or layers. Here, the first electrode plate may function as a positive electrode, and the second electrode plate may function as a negative electrode. Of course, polarities of the first and second electrode plates may differ from those described above according to the option made by one skilled in the art.

The first electrode plate may be formed by coating a first electrode active material, such as a transition metal oxide, on a first electrode collector formed of a metal foil made of, for example, aluminum (Al), and includes a first electrode uncoated portion to which the first electrode active material is not applied. The first electrode uncoated portion may function as a passage for current flowing between the first electrode plate and an exterior of the first electrode plate. However, embodiments of the present invention are not limited to the materials of the first electrode plate described above.

In addition, the first electrode uncoated portion may form a first electrode tab 121. The first electrode tab 121 may include a plurality of first electrode tabs and may be formed to protrude from the first electrode uncoated portion. The first electrode tab 121 may have a multi-tab structure in which the plurality of first electrode tabs are formed at a position (e.g., a predetermined position) to be overlapped when the first electrode plate is wound or stacked. To this end, the first electrode plate may be wound in a state in which the first electrode tabs are spaced a preset distance apart from each other to then be arranged. In an embodiment, since the first electrode tab 121 is integrally formed with the first electrode plate and is drawn out from the wound first electrode plate, current collecting efficiency of the electrode assembly 120 can be increased. However, in another embodiment, the first electrode tab 121 may be formed by a lead tab, which is separately formed from the first electrode plate according to the option made by one skilled in the art.

The second electrode plate may be formed by coating a second electrode active material, such as graphite or carbon, on a second electrode collector formed of a metal foil made of, for example, copper (Cu) or nickel (Ni), and includes a second electrode uncoated portion to which the second electrode active material is not applied. However, embodiments of the present invention are not limited to the materials of the second electrode plate described above.

In addition, a second electrode tab 122 may be formed from the second electrode uncoated portion so as to correspond to the first electrode tab 121. The second electrode tab 122 may also be formed by winding or laminating the second electrode plate in a state in which a plurality of second electrode tabs are spaced a preset distance apart from each other to then be arranged on the second electrode plate. However, in another embodiment, the second electrode tab 122 may be formed by a lead tab, which is separately formed from the second electrode plate according to the option made by one skilled in the art.

The separator may be positioned between the first electrode plate and the second electrode plate to prevent or substantially prevent electrical short circuits and to allow movement of lithium ions. In an embodiment, the separator may be made of a material selected from the group consisting of polyethylene, polypropylene, or a composite film made of polypropylene and polyethylene. However, embodiments of the present invention are not limited to the materials of the separator described above.

The electrode assembly 120 is accommodated in the case 110 with an electrolyte. The electrolyte may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$, or $LiBF_4$. In addition, the electrolyte may be in a liquid, solid, or gel phase. The first electrode tab 121 and the second electrode tab 122 are electrically connected to the current collector plate 140.

The first insulation plate 130 is positioned between the current collector plate 140 and the electrode assembly 120. The first insulation plate 130 protects the electrode assembly 120 and can prevent or substantially prevent the electrode assembly 120 from being damaged, particularly when the cap plate 180 is inwardly deformed.

In addition, the first insulation plate 130 may fix the position of the electrode assembly 120 inside the case 110 and may be electrically independent of the cap plate 180. In addition, the second insulation plate 170 in addition to the first insulation plate 130 may be further arranged on the current collector plate 140.

In an embodiment, the first insulation plate 130 includes at least one or more protrusions 131 and 132 upwardly protruding from the basic form of a plate. The protrusions 131 and 132 are coupled to the current collector plate 140 and the second insulation plate 170, thereby achieving an increased fastening force.

In addition, the first insulation plate 130 may include a hole 133 positioned corresponding to a safety vent 181 of the cap plate 180. Therefore, gases generated in the case 110 may reach the safety vent 181 of the cap plate 180 through the hole 133, and, in an embodiment, the safety vent 181 may perform an inverting operation under a pressure (e.g., a predetermined pressure).

The first insulation plate 130 may be made of a material such as polyethylene or polypropylene, but embodiments of the present invention are not limited to the materials described above.

The current collector plate 140 is formed on the first insulation plate 130 and is connected to the first and second electrode tabs 121 and 122 of the electrode assembly 120. To this end, the current collector plate 140 may be provided as a pair of a first current collector plate 141 and a second current collector plate 142.

The first current collector plate 141 is coupled to the first electrode tab 121. In an embodiment, after the first electrode tab 121 protrudes from a side portion of the first insulation plate 130, it may be bent to surround opposite sides of the first current collector plate 141. In such a state, the first current collector plate 141 may be coupled to the first electrode tab 121. Therefore, the first current collector plate 141 may be electrically connected to the first electrode tab 121 to have a positive polarity, for example.

In addition, the first current collector plate 141 may be coupled to a bottom surface of the cap plate 180 at opposite ends of the first current collector plate 141 by welding. Therefore, in an embodiment, the cap plate 180 and the case 110 coupled thereto may have the same polarity with the first current collector plate 141.

To this end, the first current collector plate 141, in an embodiment, includes coupling regions 141a and 141b formed at its opposite edges facing each other to be welded to the cap plate 180, and a plate region 141c formed between the coupling regions 141a and 141b. In an embodiment, holes are formed in the coupling regions 141a and 141b to be fastened with a coupling protrusion 180b protruding to the bottom surface of the cap plate 180, and the coupling protrusion 180b of the cap plate 180 and the coupling regions 141a and 141b are coupled to each other, thereby maintaining the first current collector plate 141 and the cap plate 180 to be coupled at accurate positions.

In the plate region 141c, a hole 141d for allowing internal gases of the case 110 to move is formed in a region corresponding to the safety vent 181 of the cap plate 180. Therefore, since the gases generated in the case 110 move up to the safety vent 181 along the hole 141d, the secondary battery 100 may sensitively operate with respect to the internal gases of the case 110.

The second current collector plate 142 is formed at a region corresponding to the second electrode tab 122 of the electrode assembly 120. In an embodiment, after the second electrode tab 122 protrudes from a side portion of the first insulation plate 130, like the first electrode tab 121, it may be bent to surround opposite sides of the second current collector plate 142. In such a state, the second current collector plate 142 may be coupled to the second electrode tab 122 by, for example, welding. Therefore, the second current collector plate 142 may be coupled to the second electrode tab 122 to have a negative polarity, for example.

The fastening plate 150 may be coupled to a top portion of the second current collector plate 142. In an embodiment, the fastening plate 150 may be coupled to the second current collector plate 142 by welding. Accordingly, the fastening plate 150 may have the same polarity with the second current collector plate 142. The fastening plate 150 upwardly protrudes and may be coupled to the terminal plate 200 to later be coupled to the cap plate 180.

The lower insulation member 160 is formed between the first insulation plate 130 and the cap plate 180. In particular, the lower insulation member 160 is formed at a position corresponding to a region of the cap plate 180 where a terminal hole 184 is formed.

In addition, the lower insulation member 160 surrounds the outer circumference of the fastening plate 150 to be electrically insulated from the cap plate 180.

Like the first insulation plate 130, the lower insulation member 160 may also be made of a material such as polyethylene or polypropylene, but embodiments of the present invention are not limited to the materials described above.

In addition, a separate gasket (not shown) may further be formed in the lower insulation member 160. The gasket may prevent or substantially prevent an electrolyte contained in the case 110 from leaking out along with the lower insulation member 160.

The second insulation plate 170 is formed between the second current collector plate 142 and the cap plate 180. The second insulation plate 170 may prevent or substantially prevent the second current collector plate 142 from making contact with the cap plate 180, thereby preventing or substantially preventing an electrical short circuit. In addition, the second insulation plate 170 is coupled to the first insulation plate 130 to fix the position of the second current collector plate 142 formed between the second insulation plate 170 and the first insulation plate 130. To this end, the second insulation plate 170 may include grooves or holes 171 corresponding to the protrusions 131 and 132 of the first insulation plate 130. In addition, the second insulation plate 170 may further include a terminal hole 172 for allowing the fastening plate 150 to penetrate. Therefore, in an embodiment, the fastening plate 150 may protrude to penetrate the cap plate 180 to then be electrically connected to the terminal plate 200.

The cap plate 180 may be provided in a plate shape to seal the opening of the case 110 and may be made of the same material as the case 110. In an embodiment, the cap plate 180 may be coupled to the case 110 by laser welding. In addition, the cap plate 130 may be electrically connected to the first electrode tab 121 through the first current collector plate 141. Here, the cap plate 180 and the case 110 have the same polarity (e.g., a first polarity or positive polarity).

In an embodiment, the cap plate 180 may fix positions of the first and second regions 141a and 141b of the first current collector plate 141 through the coupling protrusion 180b protruding to the bottom surface of the cap plate 180, and welding may be performed in such a state, thereby maintaining a stable state of physical and electrical coupling.

In an embodiment, the safety vent 181 is formed to have a thinner region than other regions of the cap plate 180. The safety vent 181 may be coupled to a stepped portion of a vent hole 180a formed in the cap plate 180. In an embodiment, the safety vent 181 is coupled to a connector part 220a of the sub terminal plate 220 extending from a first terminal plate 201 of the terminal plate 200 at a generally central contact region 181a. Therefore, the cap plate 180 coupled to the first current collector plate 141 can be finally electrically connected to the terminal plate 200 through the sub terminal plate 220.

In an embodiment, the safety vent 181 is convexly formed generally toward the case 110. Therefore, when the internal pressure of the case 110 is higher than a pressure (e.g., a predetermined pressure), the safety vent 181 is inverted and falls off the cap plate 180 according to the inverting force.

Therefore, when the safety vent 181 performs an inverting operation, an electrical connection between the cap plate 180 and the sub terminal plate 220 is cut off. Therefore, since an electrical path extending from the cap plate 180 to the sub terminal plate 220 and the first terminal plate 201 is blocked, the first terminal plate 201 becomes electrically neutral such that charging and discharging operations are stopped, thereby ensuring battery safety. In addition, since the cap plate 180 is opened by the safety vent 181 falling off the cap plate 180, the internal pressure of the case 110 can be prevented or reduced, thereby preventing or substantially preventing the secondary battery 100 from exploding.

In an embodiment, in order to inject an electrolyte into at least one side of the cap plate 180, the cap plate 180 includes an inlet 182. The electrolyte is injected into the cap plate 180 through the inlet 182, and the inlet 182 may then be sealed by an inlet plugging ball 185 and a plug 186.

The cap plate 180 includes an uneven pattern 183 formed at a side. In an embodiment, the uneven pattern 183 is configured as a concave part 183a having a relatively small height and a convex part 183b having a relatively large height. Here, the concave part 183a may be formed as a groove formed in a thickness direction of the cap plate 180, and the uneven pattern 183 may be formed by multiple concentric circles shaped by repeatedly forming the concave part 183a and the convex part 183b. The uneven pattern 183 increases a fastening force with respect to a first upper insulation member 191 of the upper insulation member 190, and a protrusion 191b formed in the first upper insulation member 191 is engaged with and coupled to the uneven pattern 183 to increase a fastened area. In addition, as will later be described, in an embodiment, a separate adhesion member 210 is formed on a contact interface between the uneven pattern 183 of the cap plate 180 and the protrusion 191b of the first upper insulation member 191, thereby maintaining a securely coupled state of the cap plate 180 and the first upper insulation member 191.

The cap plate 180 includes the terminal hole 184 formed at the other side opposite to and facing one side of the cap plate 180. Therefore, a second terminal plate 202 of the terminal plate 200 may be coupled to the fastening plate 150 through the terminal hole 184. Therefore, the second terminal plate 202 coupled through the terminal hole 184 may have the same polarity with the fastening plate 150 (e.g., a second polarity or negative polarity).

The upper insulation member 190 is formed at positions corresponding to the uneven pattern 183 and the terminal hole 184 of the cap plate 180. The upper insulation member 190 includes the first upper insulation member 191 corresponding to the uneven pattern 183 and a second upper insulation member 192 corresponding to the terminal hole 184.

In an embodiment, the first upper insulation member 191, positioned corresponding to the uneven pattern 183 of the cap plate 180, partitions regions of the cap plate 180 by a barrier 191a upwardly protruding from edges of the first upper insulation member 191 and accommodates the first terminal plate 201 within the barrier 191a. Therefore, the first upper insulation member 191 may electrically insulate between the first terminal plate 201 and the cap plate 180.

The first upper insulation member 191 may include the protrusion or groove 191b protruding upward or downward. In an embodiment, the protrusion or groove 191b of the first upper insulation member 191 is formed by concentric circles corresponding to those of the uneven pattern 183 of the underlying cap plate 180 to then be coupled to the uneven pattern 183. In an embodiment, the protrusion or groove 191b is coupled to the overlying first terminal plate 201 in the same manner as described above. In an embodiment, the adhesion member 210 is formed on contact interfaces between the first upper insulation member 191 and the uneven pattern 183 of the cap plate 180 and between the first terminal plate 201 and the protrusion or groove 191b of the first upper insulation member 191, and physically coupled states can be maintained.

The second upper insulation member 192 is formed at a region corresponding to the terminal hole 184 of the cap plate 180 and accommodates the second terminal plate 202 of the terminal plate 200 in an inside region of the second upper insulation member 192. In addition, the second upper insulation member 192 allows the second terminal plate 202 to be coupled to the fastening plate 150 through a terminal hole 192a formed therein, thereby electrically connecting the second terminal plate 202 to the fastening plate 150.

The terminal plate 200 may be provided in a pair and may include the first terminal plate 201 corresponding to the uneven pattern 183 of the cap plate 180, and the second terminal plate 202 corresponding to the terminal hole 184.

The first terminal plate 201 is coupled to a top portion of the first upper insulation member 191. With reference to FIG. 5, a protrusion or groove 201b downwardly protruding from the first terminal plate 201 is formed to be engaged with the protrusion or groove 191b of the first upper insulation member 191. Therefore, the protrusion or groove 201b of the first terminal plate 201 is engaged with and coupled to the protrusion or groove 191b of the first upper insulation member 191, thereby increasing a fastened area. In addition, since the adhesion member 210 is further formed on the contact interface between the first terminal plate 201 and the first upper insulation member 191, a securely coupled state between the first terminal plate 201 and the first upper insulation member 191 can be maintained. Therefore, the first terminal plate 201 is not in direct contact with the cap plate 180 due to the first upper insulation member 191 but is maintained in a state in which it is electrically connected with the safety vent 181 of the cap plate 180 through the sub terminal plate 220.

In an embodiment, the first terminal plate 201 is coupled to the sub terminal plate 220 through a groove 201a formed at a side of the top portion of the first terminal plate 201. In an embodiment, the groove 201a may be formed to have a height corresponding to a thickness of the sub terminal plate 220, and the first terminal plate 201 may be physically and electrically connected to the sub terminal plate 220 by performing welding on a contact region of the groove 201a.

The second terminal plate 202 is connected to the fastening plate 150 exposed through the cap plate 180. Therefore, the second terminal plate 202 may have the same polarity with the fastening plate 150 (e.g., a negative polarity). In this case, since the lower insulation member 160 and the second upper insulation member 192 are positioned between the second terminal plate 202 and the cap plate 180 and between the fastening plate 150 and the cap plate 180, electrical short circuits can be prevented or substantially prevented.

The adhesion member 210 may be formed at top and bottom regions where the first upper insulation member 191 is coupled to the uneven pattern 183 of the cap plate 180 and the first terminal plate 201 to have elements 210a and 210b. In an embodiment, some spaces where the adhesion member 210 is to be formed may be provided on contact interfaces coupled to the elements 210a and 210b. Therefore, even if the first upper insulation member 191 is coupled to the uneven pattern 183 of the cap plate 180 and the first terminal plate 201 with the adhesion member 210 interposed therebetween, the adhesion member 210 may be accommodated within the spaces without being exposed to the outside.

In an embodiment, the adhesion member 210 may include a general adhesive paste and may be provided in the form of an adhesive tape according to the option made by one skilled in the art. The first upper insulation member 191 can be maintained in a stably fasted state by the adhesion member 210 even without separate fastening members with respect to the uneven pattern 183 of the cap plate 180 and the first terminal plate 201. In addition, with the configuration of the adhesion member 210, a welding process is not required in sequentially coupling the cap plate 180, the first upper insulation member 191, and the first terminal plate 201, thereby simplifying the configuration of the electrode terminals and reducing a manufacturing process and cost.

The sub terminal plate 220 is formed between the first terminal plate 201 and the safety vent 181. The sub terminal plate 220 is in contact with the first terminal plate 201 to be electrically connected thereto. In an embodiment, the sub terminal plate 220 includes connector parts 220a and 220b protruding toward the safety vent 181 of the cap plate 180.

Here, the connector parts 220a and 220b are integrally formed with an end 220c at which the sub terminal plate 220 is coupled to the first terminal plate 201, thereby obviating the need for separate components or a coupling process, such as welding. In addition, since the sub terminal plate 220 including the connector parts 220a and 220b is coupled to the first terminal plate 201, operating reliability of the connector parts 220a and 220b may be increased.

In an embodiment, the connector parts 220a and 220b may be fixed to the safety vent 181 by welding. In addition, the connector parts 220a and 220b maintain a state in which a level (e.g., a predetermined level) of elastic restoring force is applied thereto.

In more detail, the connector parts 220a and 220b include a contact region 220a fixed to the contact region 181a of the safety vent 181, and an extension region 220b where elastic restoring force is applied to the contact region 220a. The contact region 220a may be coupled to the contact region 181a of the safety vent 181 by welding. In addition, the extension region 220b is formed in a bent shape to have elastic restoring force and is maintained in a state in which it is fixed by the welding of the contact region 220a. Therefore, as will later be described, if the safety vent 181 is inverted to be separated from the cap plate 180, the safety vent 181 is lifted by the force applied from the extension region 220b, thereby cutting off an electrical connection.

Herein, the operation of lifting and opening the safety vent 181 will be described in more detail.

Figure 6:
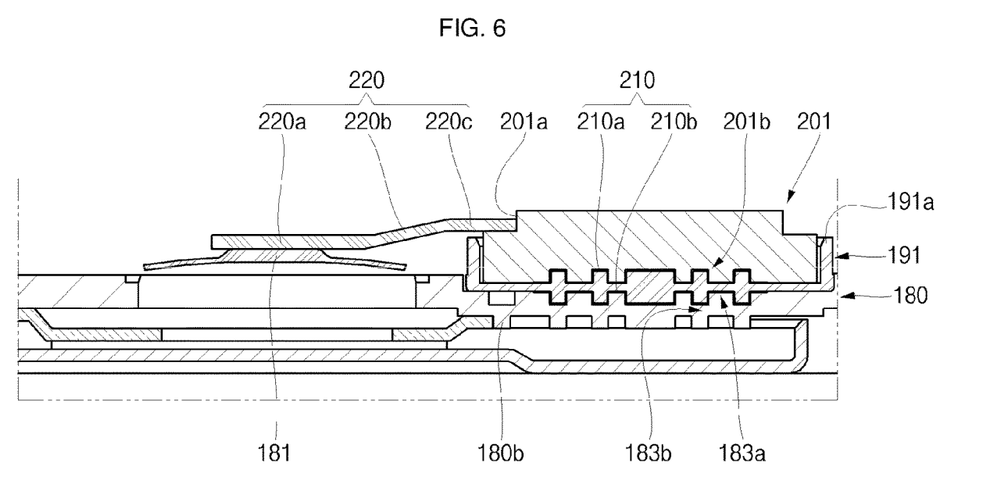
FIG. 6 is a partially exploded view of the region "C" of FIG. 2, illustrating a state in which a safety vent is opened in the secondary battery, according to an embodiment of the present invention.

FIG. 6 is a partially exploded view of the region "C" of FIG. 2, illustrating a state in which a safety vent is opened in the secondary battery, according to an embodiment of the present invention.

Referring to FIG. 6 together with FIG. 5, when the internal pressure of the case 110 is higher than a certain pressure (e.g., a predetermined pressure), the safety vent 181 performs an inverting operation. In addition, as the result of the inverting operation, edges of the safety vent 181 are ruptured from the cap plate 180. Here, the safety vent 181 coupled to the contact region 220a is lifted by the elastic restoring force of the extension region 220b as one of the connector parts 220a and 220b of the terminal plate 220. In addition, since the safety vent 181 is continuously maintained in the opened state, it is possible to prevent the secondary battery 100 from exploding even if the internal pressure of the case 110 is increased. In addition, an electrical connection of the sub terminal plate 220 and the first terminal plate 201, which are electrically connected to the cap plate 180 by the safety vent 181, is broken by opening the safety vent 181. Therefore, since the electrical connection of the secondary battery 100 is broken, the secondary battery 100 has increased electrical safety.

While the secondary battery according to the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A secondary battery comprising:
   a case having an internal space;
   an electrode assembly inserted in the case and including a first electrode plate, a second electrode plate, and a separator between the first electrode plate and the second electrode plate;
   a cap plate sealing the case, electrically connected to the first electrode plate of the electrode assembly, and a safety vent on a region of the cap plate;
   an upper insulation member on the cap plate;
   a sub terminal plate on the upper insulation member and electrically connected to the safety vent through a connector part extending at an end of the sub terminal plate; and
   a terminal plate making contact with and coupled to a top portion of the upper insulation member and coupled to the sub terminal plate,
   wherein the sub terminal plate is connected between the safety vent and the terminal plate, and the safety vent is configured to be disconnected from the cap plate while remaining connected to the sub terminal plate when an internal pressure of the case is greater than a certain pressure.

2. The secondary battery of claim 1, further comprising an adhesion member on at least one of contact interfaces where the upper insulation member is coupled to the cap plate and the terminal plate.

3. The secondary battery of claim 1, wherein the terminal plate accommodates and is coupled to the sub terminal plate through a groove having a height corresponding to a thickness of the sub terminal plate.

4. The secondary battery of claim 1, further comprising a current collector plate coupled to the first electrode plate of the electrode assembly on at least one region and coupled to a bottom surface of the cap plate to connect the first electrode plate with the cap plate.

5. The secondary battery of claim 1, wherein the sub terminal plate is welded to the terminal plate and the safety vent.

6. A secondary battery comprising:
a case having an internal space;
an electrode assembly inserted in the case and including a first electrode plate, a second electrode plate, and a separator between the first electrode plate and the second electrode plate;
a cap plate sealing the case, electrically connected to the first electrode plate of the electrode assembly, and including a safety vent on a region of the cap plate;
an upper insulation member on the cap plate;
a sub terminal plate on the upper insulation member and electrically connected to the safety vent through a connector part extending at an end of the sub terminal plate; and
a terminal plate making contact with and coupled to a top portion of the upper insulation member and coupled to the sub terminal plate,
wherein the terminal plate is electrically independent of the cap plate through the upper insulation member.

7. A secondary battery comprising:
a case having an internal space;
an electrode assembly inserted in the case and including a first electrode plate, a second electrode plate, and a separator between the first electrode plate and the second electrode plate;
a cap plate sealing the case, electrically connected to the first electrode plate of the electrode assembly, and including a safety vent on a region of the cap plate;
an upper insulation member on the cap plate;
a sub terminal plate on the upper insulation member and electrically connected to the safety vent through a connector part extending at an end of the sub terminal plate; and
a terminal plate making contact with and coupled to a top portion of the upper insulation member and coupled to the sub terminal plate,
wherein the cap plate includes an uneven pattern on a region corresponding to the upper insulation member, and the upper insulation member is engaged with and coupled to the cap plate through at least one of a protrusion or a groove corresponding to the uneven pattern.

8. The secondary battery of claim 7, further comprising an adhesion member on a contact interface between the upper insulation member and the cap plate.

9. The secondary battery of claim 7, wherein the terminal plate includes at least one of a protrusion or a groove on a region corresponding to the at least one of the protrusion or the groove of the upper insulation member and is engaged with and coupled to the at least one of the protrusion or the groove of the upper insulation member.

10. The secondary battery of claim 9, further comprising an adhesion member on a contact interface between the terminal plate and the upper insulation member.

11. A secondary battery comprising:
a case having an internal space;
an electrode assembly inserted in the case and including a first electrode plate, a second electrode plate, and a separator between the first electrode plate and the second electrode plate;
a cap plate sealing the case, electrically connected to the first electrode plate of the electrode assembly, and including a safety vent on a region of the cap plate;
an upper insulation member on the cap plate;
a sub terminal plate on the upper insulation member and electrically connected to the safety vent through a connector part extending at an end of the sub terminal plate;
a terminal plate making contact with and coupled to a top portion of the upper insulation member and coupled to the sub terminal plate; and
a current collector plate coupled to the first electrode plate of the electrode assembly on at least one region and coupled to a bottom surface of the cap plate to connect the first electrode plate with the cap plate,
wherein the current collector plate is welded to the bottom surface of the cap plate.

* * * * *